United States Patent [19]

Strutz et al.

[11] Patent Number: 5,423,902
[45] Date of Patent: Jun. 13, 1995

[54] FILTER MATERIAL AND PROCESS FOR REMOVING OZONE FROM GASES AND LIQUIDS

[75] Inventors: Heinz Strutz, Usingen; Dietrich Fleischer, Darmstadt; Jürgen Kulpe, Frankfurt am Main; Andreas Schleicher, Einhausen, all of Germany

[73] Assignee: Hoechst Aktiengesellschaft, Frankfurt am Main, Germany

[21] Appl. No.: 110,586

[22] Filed: Aug. 23, 1993

[30] Foreign Application Priority Data

May 4, 1993 [DE] Germany .................. 43 14 734.8

[51] Int. Cl.$^6$ .................................. B01D 53/04
[52] U.S. Cl. .......................... 95/273; 95/45; 95/138
[58] Field of Search .............. 95/45, 46, 138, 274; 96/6, 108; 55/512, 522, 527, 528

[56] References Cited

U.S. PATENT DOCUMENTS

| | | | |
|---|---|---|---|
| 4,115,562 | 9/1978 | Gragson et al. | 55/528 X |
| 4,840,838 | 6/1989 | Wyss | 55/528 X |
| 5,129,920 | 7/1992 | Albers et al. | 55/528 X |
| 5,171,339 | 12/1992 | Forsten | 55/528 X |
| 5,246,474 | 9/1993 | Greatorex | 55/528 X |

FOREIGN PATENT DOCUMENTS

| | | | |
|---|---|---|---|
| 3728802 | 3/1988 | Germany . | |
| 55-005734 | 1/1980 | Japan | 95/138 |
| 58-081425 | 5/1983 | Japan . | |
| 60-197223 | 10/1985 | Japan . | |
| 1-274813 | 11/1989 | Japan | 55/528 |
| 2-071809 | 3/1990 | Japan | 55/528 |
| 3-032711 | 2/1991 | Japan | 55/528 |
| 3-249250 | 11/1991 | Japan | 55/528 |
| 3-270718 | 12/1991 | Japan . | |
| 0827132 | 5/1981 | U.S.S.R. | 95/138 |

OTHER PUBLICATIONS

Japanese Abstract No. JP-A2-60,179,115, Sep. 13, 1985.

*Primary Examiner*—Robert Spitzer
*Attorney, Agent, or Firm*—Connolly and Hutz

[57] ABSTRACT

A filter material based on a polyarylene thioether having repeating units of the formula

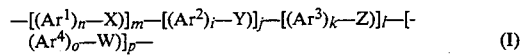

in which $Ar^1$, $Ar^2$, $Ar^3$, $Ar^4$, W, X, Y and Z, independently of each other, are identical or different, the indices n, m, i, j, k, l, o and p, independently of each other, are zero or integers 1, 2, 3 or 4, their sum being at least 2, $Ar^1$, $Ar^2$, $Ar^3$ and $Ar^4$ are arylene systems having 6 to 18 carbon atoms, and W, X, Y and Z are divalent linking groups, selected from —$SO_2$—, —S—, —SO—, —CO—, —O—, —$CO_2$—, or alkylene groups or alkylidene groups having 1 to 6 carbon atoms is suitable for removing ozone from gases or liquids. The removal proceeds quantitatively, no volatile products being formed.

7 Claims, No Drawings

FILTER MATERIAL AND PROCESS FOR REMOVING OZONE FROM GASES AND LIQUIDS

The invention relates to a filter material and a process for removing ozone from gases and liquids by bringing the gas stream or a liquid into contact with a filter material made of polyarylene thioether.

It is known that small amounts of ozone are formed in electrophotographic copier processes and printing processes. The resulting ozone is constantly given off into the surrounding air by apparatuses used, for example photocopiers and laser printers. In addition to the odor pollution, a health risk can result from ozone, even in small concentrations ("Ozone", M. Horváth, Topics in Inorganic and General Chemistry; Monograph 20, Elsevier, page 75 ff.).

In order to remedy this, a multiplicity of processes have been developed which describe the removal of ozone from the air stream released by such apparatuses. The ozone is either destroyed, or chemically or physically bound. The destruction of ozone is possible, for example, by heating or by interaction with a metal catalyst. In the thermal destruction of ozone, the energy consumption and the high temperature which are necessary for complete ozone destruction are disadvantageous (JP-A-60/197, 223 and JP-A-60/192, 115).

In addition, it is known to pass the gas stream through a filter in which the ozone is catalytically decomposed (JP 58/081, 425). The base material of the filter is impregnated with one or more metal compounds, metals or alloys, for example iron compounds, manganese compounds or nickel compounds, to which is further added a compound or a metal selected from the group comprising the so-called noble metals, for example palladium or platinum. These catalysts are very expensive and generally only have a restricted operating life, since such heterogeneous catalysts are rapidly deactivated by various catalyst poisons.

A support material of aluminum oxide or activated charcoal, which is impregnated with ethylenically unsaturated compounds which react with ozone, is also used as a filter (DE-A-3,728,802). It is a disadvantage that the compounds, for example terpenes, depending on the support material, are volatile in many cases, that is can be discharged in small amounts and thus be lost. Moreover, only a small part of the filter weight is available as an active constituent.

In addition, a filter for ozone destruction is known which is composed of a fiber plate, the fibers of which contain an ozone-destroying catalyst (JP 91-A-270, 718). These fibers, which, in a preferred embodiment, are porous, are composed of a polymer having one of the functional groups below which react strongly with ozone, for example —SH, =S, —NH$_2$, =NH, —CN and —OH. Ozone-destroying catalysts mentioned are metals such as gold, silver, copper, palladium, iron, nickel, cobalt and manganese or oxides thereof and alumina and kieselguhr. The fiber required for the production of the filter is obtained by a conventional spinning process, in which the catalyst is dispersed in the spinning solution and is uniformly distributed in the fibers after spinning. By addition of a second polymer, which, with the first polymer, initiates a phase separation, and various secondary treatments of the spun product, a porous phase is obtained in which the catalyst particles are contained. The fibers obtained are then fabricated by conventional methods to give the filter. Apart from the fact that the polymers deemed to be suitable are only mentioned en bloc—only polyacrylonitrile is disclosed—the production of the filter is laborious and very expensive.

The object of the invention was therefore to provide a filter and a process for ozone removal in which the disadvantages mentioned do not occur.

The invention relates to a polymer-based filter for removing ozone from gases and liquids, which is composed of a polyarylene thioether

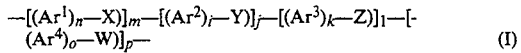

where Ar$^1$, Ar$^2$, Ar$^3$, Ar$^4$, W, X, Y and Z, independently of each other, are identical or different. The indices n, m, i, j, k, l, o and p are, independently of each other, zero or integers 1, 2, 3 or 4, where their sum must give at least 2, Ar$^1$, Ar$^2$, Ar$^3$ and Ar$^4$ in the formula (I) are arylene systems having 6 to 18 carbon atoms, W, X, Y and Z are divalent linking groups, selected from —SO$_2$—, —S—, —SO—, —CO—, —O—, —CO$_2$—, alkylene groups or alkylidene groups having 1 to 6, preferably 1 to 4 carbon atoms.

A process is also claimed for removing ozone from gases, in which a filter made of a polyarylene thioether having repeating units of the formula (I) as an ozone-destroying compound is used, the gas or the liquid being brought into contact with the surface of the filter material.

The polyarylene thioether preferred is poly(phenylene sulfide) (PPS) having the repeating unit of the formula (II), whose preparation process is described, for example, in U.S. Pat. Nos. 3,354,129, 3,919,177, 4,038,262 and 4,282,347.

The PPS of the formula (II) can also have, up to a proportion of 30 mol %, a 1,2- and/or 1,3-linking on the aromatic nucleus.

Generally suitable for the invention are polyarylene thioethers which have a mean molecular weight of 4,000 to 200,000, preferably 10,000 to 150,000, in particular 25,000 to 100,000, determined by GPC.

The polymers can be used as powder, fibers, films or moldings for the production of a filter. By suitable processes, the latter are also produced with particularly large surface area, for example having a lattice structure or honeycomb structure. The powders have commercially conventional particle sizes, granules also being usable. It is important in this case that the gas to be treated or the liquid can pass through the powder, for example in the form of a solid bed, without disturbance. If the polymers are used as fibers, these are used as staple fibers, needle felt, nonwoven material, card sliver or fabric. Films or film trimmings can also be used in a suitable form.

The ozone-containing gas stream or the liquid can be treated with the filter material according to the invention at any temperature which is beneath the softening point of the polymers. The temperatures are generally in the range from —10° to +80° C., preferably 0° to 50° C.

The removal of ozone generally proceeds quantitatively, the reaction times being dependent on the flow velocities and the surface area of the filter material or the bed height in the case of powders. Generally, the residence time in the filter is 0.1 seconds to 10 minutes, preferably 0.5 second to 1 minute. However, the limiting values can also be passed.

When the polyarylene thioethers used are treated with the ozone-containing medium, the polymers are converted to the polyarylene sulfoxidestage. The adsorption capacity of the filter according to the invention extends up to complete oxidation of the sulfide bridges. The exhausted filter material, ie. the polyarylene sulfoxide, represents a newly formed polymer. This can be reused, e.g. for other purposes, for example for preparation of moldings. The exhausted filter materials are thus completely recyclable and do not pollute the environment.

In the removal of ozone from the gas stream or liquid stream, no volatile products are formed.

The filter material based on polyarylene thioether can generally be used as unblended material. However, addition of conventional fillers is also possible, such as chalk, talcum, clay, mica and/or fibrous reinforcing materials, such as glass fibers and carbon fibers, whiskers and other conventional additives and processing aids, e.g. lubricants, release agents, antioxidants and UV stabilizers.

The filter according to the invention can be used with all ozone-containing gas streams and liquids. Thus, it is used, for example, in the elimination of the ozone used in sterilization or resulting from a copier apparatus, in addition for the removal and detoxification of ozone in liquids.

EXAMPLES

The ozone required as starting material in the examples was produced with a commercial ozone generator which was operated with pure oxygen.

The ozone concentration was determined used a measuring apparatus based on a UV photometer. The ozone/oxygen mixture was then diluted with air or argon up to the concentrations mentioned. Since it is known that ozone slowly decomposes in water or in moist gases, the gases used for the dilution were dried. After the dilution, the gas stream was divided. One part was passed through an empty tube, another was passed through a corresponding vertical tube filled with the filter material. In order to be able to receive the polymer, the glass tube was closed at the bottom end with a porous glass plate (frit). The streams were regulated in such a way that, per unit of time, equal volumes passed through the two tubes. The ozone concentration was determined using potassium iodide solution in sulfuric acid in a known manner ("Ozone" M. Horváth, L. Bilitzky and J. Hüttner, Elsevier, 1985, p. 81 ff. (Topics in Inorganic and General Chemistry); Collection of Monographs ed. R. J. H. Clark (Monograph No. 20)). The iodine liberated by the ozone was converted to the amount of ozone introduced.

1) A glass tube having a diameter of approximately 25 mm, which was closed at the bottom end with a glass frit, was filled with 6 g of a poly(phenylene sulfide) powder (Tg 92° C., mean molecular weight 30,000, bulk density 0.462 g/cm$^3$). The bed height was approximately 26 mm. The ozone-containing gas stream was passed through this powder bed. The flow velocities and the ozone concentration were successively adjusted. Measurements were taken over the entire period reported in each case (Table 1).

TABLE 1

| Flow velocity (l/h) | Time (min) | Ozone concentration (mg/m$^3$) | Ozone concentration after the filter (mg/m$^3$) |
|---|---|---|---|
| 9.0 | 300 | 710 | — |
| 9.0 | 60 | 5347 | — |
| 9.5 | 60 | 252 | — |
| 20 | 120 | 19.5 | — |

In no case was iodine precipitated from the potassium iodide solution, ie. the removal of the ozone was quantitative.

2) Example 1 was repeated using a glass tube having approximately 10 mm internal diameter and a glass frit. Bed height of the PPS powder approximately 4 cm, equivalent to 1.5 g of powder. The gas stream was passed through the filter formed at the following flow velocities and ozone concentrations (Table 2).

TABLE 2

| Flow velocity (l/h) | Time (min) | Ozone concentration (mg/m$^3$) | Ozone concentration after the filter (mg/m$^3$) |
|---|---|---|---|
| 9.0 | 110 | 500 | — |
| 9.0 | 190 | 383 | — |
| 10.0 | 70 | 105 | — |

Here, too, no ozone was detected after the filter.

We claim:

1. A process for removing ozone from gases which comprises the steps of:
providing a filter material having repeating units of the formula

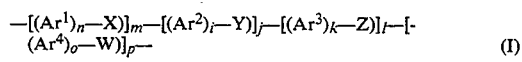

in which Ar$^1$, Ar$^2$, Ar$^3$, Ar$^4$, W, X, Y and Z, independently of each other, are identical or different, the indices n, m, i, j, k, l, o and p, independently of each other, are zero or integers 1, 2, 3 or 4, their sum being at least 2, Ar$^1$, Ar$^2$, Ar$^3$ and Ar$^4$ are arylene systems having 6 to 18 carbon atoms, and W, X, Y and Z are divalent linking groups, selected from —SO$_2$—, —S—, —SO—, —CO—, —O—, —CO$_2$—, or alkylene groups or alkylidene groups having 1 to 6 carbon atoms, as ozone removing compound, and
bringing the gas into contact with the surface of the filter material.

2. The process as claimed in claim 1, wherein poly(phenylene sulfide) having repeating units of the formula

is used.

3. The process as claimed in claim 1, wherein the mean molecular weight is 4,000 to 200,000.

4. The process as claimed in claim 1, wherein the treatment temperature is −10° to +80° C.

5. The process as claimed in claim 1, wherein the treatment temperature is 0° to 50° C.

6. The process as claimed in claim 1, wherein the treatment time is 0.1 second to 10 minutes.

7. The process as claimed in claim 1, wherein the treatment time is 0.5 second to 1 minute.

* * * * *

UNITED STATES PATENT AND TRADEMARK OFFICE
CERTIFICATE OF CORRECTION

PATENT NO. : 5,423,902
DATED : June 13, 1995
INVENTOR(S) : Heinz Strutz, et al.

It is certified that error appears in the above-indentified patent and that said Letters Patent is hereby corrected as shown below:

at column 4, line 31 should read --providing a filter material made of a polyarylene thioether having repeating units of--.

Signed and Sealed this

Fifteenth Day of July, 1997

Attest:

Attesting Officer

BRUCE LEHMAN

Commissioner of Patents and Trademarks